(12) United States Patent
Kirkpatrick et al.

(10) Patent No.: US 10,081,892 B2
(45) Date of Patent: Sep. 25, 2018

(54) SYSTEMS AND METHODS FOR AIR ENTANGLEMENT

(71) Applicant: GOODRICH CORPORATION, Charlotte, NC (US)

(72) Inventors: Christopher T. Kirkpatrick, Pueblo West, CO (US); Jean-Francois Le Costaouec, Pueblo West, CO (US); John Linck, Pueblo, CO (US); Paul Perea, Pueblo West, CO (US); Gregory J. Loughry, Pueblo West, CO (US); Daniel Register, Colorado Springs, CO (US); Lance McWilson, Colorado Springs, CO (US); Lauren Rosler, Ramah, CO (US); Christopher L. Everhart, Boone, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 249 days.

(21) Appl. No.: 15/245,007

(22) Filed: Aug. 23, 2016

(65) Prior Publication Data

US 2018/0057979 A1    Mar. 1, 2018

(51) Int. Cl.
*D04H 18/00* (2012.01)
*D04H 1/492* (2012.01)
*D04H 3/11* (2012.01)

(52) U.S. Cl.
CPC ............. *D04H 18/00* (2013.01); *D04H 1/492* (2013.01); *D04H 3/11* (2013.01)

(58) Field of Classification Search
CPC .......... D04H 1/492; D04H 1/495; D04H 3/11; D04H 5/03; D04H 18/00; D04H 13/003; D04H 1/4242; D03D 37/00

USPC .......................................... 28/104, 105, 106
See application file for complete search history.

(56) References Cited

U.S. PATENT DOCUMENTS

| 2,862,251 A | 12/1958 | Frank |
| 3,110,151 A | 11/1963 | Bunting, Jr. |
| 3,120,463 A | 2/1964 | Russell |

(Continued)

FOREIGN PATENT DOCUMENTS

| EP | 2341175 | 7/2011 |
| EP | 2955260 | 12/2015 |

(Continued)

OTHER PUBLICATIONS

Notice of Allowance dated Aug. 18, 2017 in U.S. Appl. No. 14/671,492.

(Continued)

*Primary Examiner* — Amy Vanatta
(74) *Attorney, Agent, or Firm* — Snell & Wilmer, L.L.P.

(57) ABSTRACT

A loom system for making a fibrous preform may comprise a base, a bedplate coupled to the base, wherein the bedplate is configured to rotate about an axis of rotation, and an air entangling module coupled to the base. The air entangling module may comprise an air entangling head coupled to an outer support and an inner support, wherein the air entangling head is configured to apply a jet of air toward the bedplate at an entangling zone. The air entangling head may have freedom of motion along the outer support and the inner support, and may be configured to rest on top of a fibrous layer.

20 Claims, 6 Drawing Sheets

(56) References Cited

U.S. PATENT DOCUMENTS

| | | | | |
|---|---|---|---|---|
| 3,333,315 A | * | 8/1967 | Dyer | ............... D04H 3/10 28/104 |
| 3,422,510 A | | 1/1969 | Frate | |
| 3,458,905 A | * | 8/1969 | Dodson, Jr. | ......... B65H 69/066 28/104 |
| 3,485,706 A | * | 12/1969 | Evans | ............. D04H 18/04 162/115 |
| 3,490,103 A | * | 1/1970 | Asaka | ........... A61F 13/00991 28/105 |
| 3,688,355 A | | 9/1972 | Masahide | |
| 3,747,161 A | | 7/1973 | Kalwaites | |
| 4,612,874 A | | 9/1986 | Mitter | |
| 5,167,745 A | * | 12/1992 | Governale | ............ D04H 1/00 156/285 |
| 5,238,644 A | | 8/1993 | Boulanger | |
| 6,009,605 A | | 1/2000 | Olry et al. | |
| 6,052,983 A | | 4/2000 | Moran | |
| 6,347,440 B1 | | 2/2002 | Duval | |
| 6,363,593 B1 | | 4/2002 | Duval et al. | |
| 6,367,130 B1 | | 4/2002 | Duval | |
| 6,471,910 B1 | * | 10/2002 | Haggard | ............ D01D 5/253 156/167 |
| 7,185,404 B2 | | 3/2007 | Delecroix | |
| 7,530,150 B2 | | 5/2009 | Brennan | |
| 2006/0042057 A1 | * | 3/2006 | Taniguchi | ........... D04H 18/04 28/104 |
| 2011/0154629 A1 | * | 6/2011 | Delecroix | ............. D04H 18/00 28/108 |
| 2011/0277284 A1 | | 11/2011 | Muenstermann | |
| 2015/0354110 A1 | | 12/2015 | Linck et al. | |
| 2016/0122930 A1 | | 5/2016 | Le Costaouec et al. | |
| 2016/0281282 A1 | | 9/2016 | Linck | |

FOREIGN PATENT DOCUMENTS

| | | |
|---|---|---|
| EP | 2955260 A1 | 12/2015 |
| EP | 3073004 A1 | 9/2016 |
| JP | 2002210737 | 7/2002 |
| WO | 9928122 A1 | 6/1999 |
| WO | 2007007045 | 1/2007 |

OTHER PUBLICATIONS

First Action Interview Pilot Program Interview Communication dated Jun. 19, 2017 in U.S. Appl. No. 14/671,492.
Communication under Rule 71(3) EPC dated Aug. 16, 2017 in EP Application No. 16162229.5.
Extended European Search Report dated Jul. 29, 2016 in European Application No. 16162229.5.
Extended European Search Report dated Dec. 6, 2017 in European Application No. 17187449.8.
European Patent Office, European Search Report dated Jan. 29, 2018 in Application No. 17207987.3-1102.

\* cited by examiner ns and methods for air entanglement

FIELD

This disclosure generally relates to creation of fibrous preforms, and more particularly to the creation of fibrous preforms produced by air entanglement.

BACKGROUND

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature capability, light weight, stable friction performance and/or other characteristics of the C/C material. In particular, the C/C material used in C/C parts such as aircraft brakes is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure.

C/C material is generally formed by utilizing continuous fibers, i.e., carbon fiber or oxidized polyacrylonitrile (PAN) fibers, referred to as "OPF." Such OPF fibers are the precursors of carbonized PAN fibers and are used to fabricate a preform shape using a needle punching process. OPF fibers are layered in selected orientations into a fibrous preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

In typical OPF preforms used for production of aircraft brake preforms, z-fibers are created by transferring in-plane fibers into the z-direction by needling. Z-directions fibers are created due to the high elongation characteristics of the OPF. OPF maintains elongation values in the range of 12-14%. Carbon fibers on the other hand have elongation values that are typically less than 1%. Thus, needling operations do not effectively create a z-fiber; carbon fibers break well before a z-fiber is created.

SUMMARY

A loom system for making a fibrous preform is disclosed. In various embodiments, the loom system may comprise a base, a bedplate coupled to the base, wherein the bedplate is configured to rotate about an axis of rotation, and an air entangling module coupled to the base. The air entangling module may comprise an air entangling head coupled to an outer support and an inner support, wherein the air entangling head is configured to apply a jet of air toward the bedplate at an entangling zone. The air entangling head may have freedom of motion along the outer support and the inner support, and may be configured to rest on top of a fibrous layer. In various embodiments, the bedplate comprises an aperture configured to allow circulation of the jet of air from the air entangling head through the bedplate. In various embodiments, the loom system may comprise a vacuum chamber comprised within the base and disposed below the bedplate. In various embodiments, the loom system may comprise a bobbin coupled to the base configured to dispose the fibrous layer onto the bedplate.

In various embodiments, the loom system may comprise a first roller coupled to a proximal side of the air entangling head configured to flatten the fibrous layer at the proximal side of the air entangling head. In various embodiments, the loom system may comprise a second roller coupled to a distal side of the air entangling head configured to flatten the fibrous layer at the distal side of the air entangling head. In various embodiments, the loom system may comprise an upper vacuum head disposed proximate to the entangling zone, wherein the upper vacuum head may be configured to collect stray fibers above the bedplate. In various embodiments, the air entangling module may further comprise an inner diameter spring coupled to the inner support and an outer diameter spring coupled to the outer support, wherein the inner diameter spring and the outer diameter spring are configured to at least one of increase or decrease a load applied to the fibrous layer by the air entangling head. In various embodiments, the base may be coupled to a support structure configured to support the base and a motor, and separate the base from the motor. In various embodiments, the motor may be configured to rotate a driveshaft coupled to the motor, wherein the driveshaft is coupled to the bedplate and is configured to rotate the bedplate.

In various embodiments, a loom system for making a fibrous preform may comprise a base, a bedplate coupled to the base, wherein the bedplate is configured to rotate about an axis of rotation, an air entangling module coupled to the base, the air entangling module comprising an air entangling head configured to apply a jet of air toward the bedplate an entangling zone, and a vacuum chamber within the base and disposed below the bedplate. In various embodiments, the loom system may comprise a bobbin configured to dispose a fibrous layer onto the bedplate. In various embodiments, the loom system may comprise a roller coupled to at least one of a proximal side or a distal side of the air entangling head configured to flatten a fibrous layer proximate to the entangling zone. In various embodiments, the air entangling head may be coupled to an inner support and an outer support, wherein the air entangling head has freedom of motion along the inner support and the outer support. In various embodiments, the loom system may comprise an upper vacuum head disposed proximate to the entangling zone, wherein the upper vacuum head is configured to collect stray fibers from an upper surface of the base.

In various embodiments, a method for making a fibrous preform may comprise rotating a bedplate of a loom system for making the fibrous preform about an axis of rotation, disposing a plurality of fibrous layers onto a first fibrous layer during the rotating the bedplate, resting an air entangling head of an air entangling module on top of the plurality of fibrous layers, and applying a jet of air to the plurality of fibrous layers from the air entangling head at an entangling zone of the loom system. In various embodiments, the method may comprise disposing the first fibrous layer onto the bedplate by clamping an inner diameter portion and an outer diameter portion of the first fibrous layer to the bedplate. In various embodiments, the method may comprise collecting stray fibers from a vacuum chamber disposed below the bedplate. In various embodiments, the method may comprise flattening by a roller coupled to the air entangling head the plurality of fibrous layers at least one of before or after the applying the jet of air to the plurality of fibrous layers.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

Figure 1A:
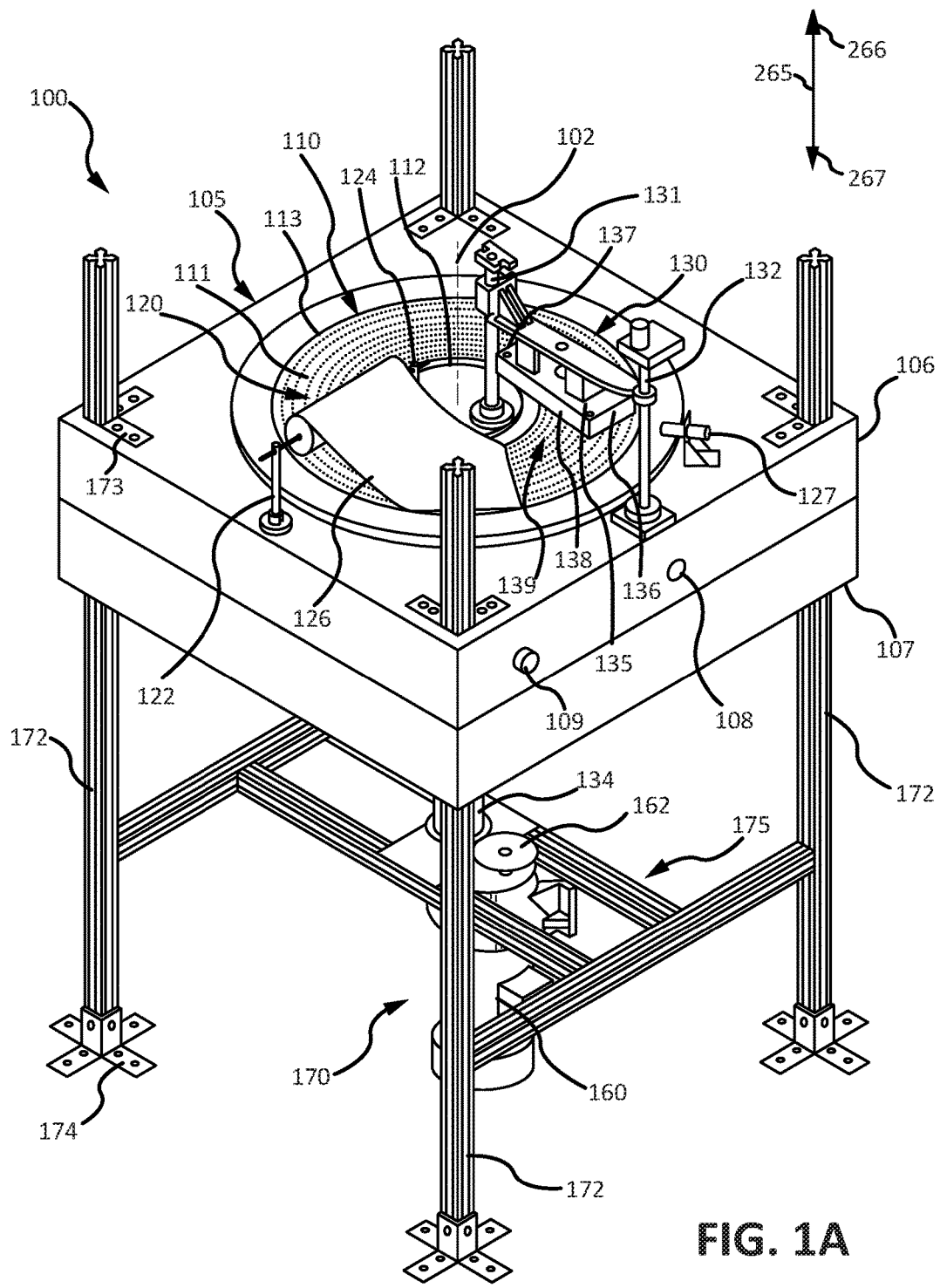
FIGS. 1A and 1B illustrate perspective views of a loom system for making a composite structure, in accordance with various embodiments.

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material for use in aircraft braking systems is generally formed by utilizing continuous oxidized polyacrylonitrile (PAN) fibers, referred to as "OPF" fibers. Such OPF fibers are the precursors of carbonized PAN fibers. C/C brake disks are also made using carbon fiber/phenolic prepregs and densified by either multiple infiltration/pyrolysis cycles or by chemical vapor infiltration (CVI). Thus, while some embodiments herein are discussed with reference to OPF, C/C brake disks may also be made by starting with carbon fiber as opposed to OPF. C/C disks manufactured using carbon fibers may comprise woven carbon fiber fabrics in a phenolic resin matrix which is the pyrolyzed to convert the matrix to carbon char. The fibers may be used to fabricate a preform shape using an entanglement process, for example, as discussed further herein with reference to various embodiments that use fluids such as air to orientate and/or entangle the fibers and/or fiber layer(s).

In various embodiments, fibers are layered in a selected orientation into a fibrous preform of a selected geometry. Two or more layers of fibers may be layered onto a support and are then entangled together simultaneously or in a series of entangling steps. This process interconnects the horizontal fibers with a third direction (also called the z-direction). The fibers extending into the third direction are also called z-fibers. This entangling process may involve directing jets of air into the fibrous layers to displace a portion of the horizontal fibers in the z-direction. Thus, a fibrous preform may be produced using air entanglement by first combining or stacking multiple fibrous layers then entangling the fibrous layers using air entanglement to produce a multi-dimensional fabric including z-fibers.

As used herein, "loom" may refer to any device for creating textiles, such the loom systems discussed herein. "Fibrous preform" may be a preform comprising carbon fibers and/or OPF, or any other suitable material, which may be densified into a C/C structure for use in braking systems, as described herein.

Figure 1B:
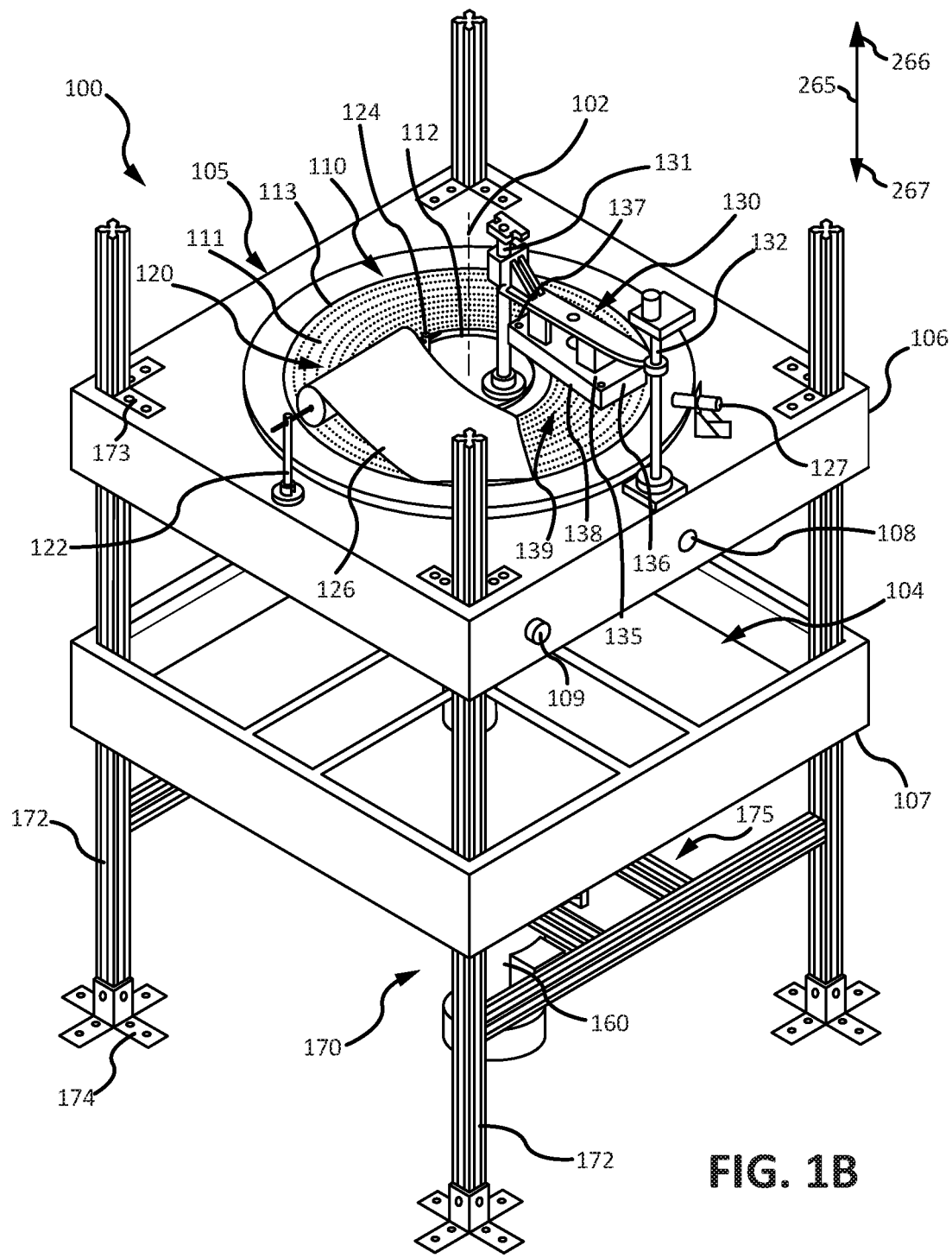

According to various embodiments, with reference to FIGS. 1A and 1B, a loom system 100 for making a fibrous preform may comprise a bedplate 110, upon which fibrous material 126 may be layered. Bedplate 110 may be annular in order to produce net shape fibrous preforms, such as net shape fibrous preforms for brakes. A "net shape" preform indicates that the initial production of the item is very close to the final (net) shape. Therefore, such an annular bedplate may be advantageously utilized to form a near net shape air entangled fibrous preform with reduced waste.

In various embodiments, bedplate 110 may be stationary or movable. Stationary bedplates (not shown) may be smooth bedplates, such that the other components of loom system 100 may rotate around, and with respect to, the stationary bedplate to facilitate layering and/or entangling fibrous material 126. Movable bedplates (such as bedplate 110 in FIGS. 1A and 1B) may be rotatable bedplates that comprise a surface that generates friction between the bedplate and fibrous material 126 such that the bedplates move and/or entrain fibrous material 126 to facilitate layering and/or entangling fibrous material 126. As depicted in FIGS. 1A and 1B, bedplate 110 may be moveable and configured to rotate about axis of rotation 102. With momentary additional reference to FIG. 4, bedplate housing 410 of base 105, upon which bedplate 110 rests and/or is coupled, comprises bearings 403, which are configured to allow the rotation of bedplate 110 relative to base 105, which remains stationary.

With continued reference to FIGS. 1A and 1B, the positions of components of a loom system, such as loom system 100, relative to one another may be described along axis 265, which is parallel to axis of rotation 102. Components more toward the "top" of loom system 100, i.e., "above" other components, may be further in direction 266. Components more toward the "bottom" of loom system 100, i.e., "below" other components, may be further in direction 267.

In various embodiments, bedplate 110 may comprise apertures 111 configured to allow circulation of jets of air through bedplate 110 during the entanglement of layers of fibrous material 126. Bobbin 120 may be coupled to base 105 and located above bedplate 110. The length of bobbin 120 may span a length of bedplate 110 between an inner diameter 112 and an outer diameter 113 of bedplate 110. Bobbin 120 may be above bedplate 110 and coupled between an inner bobbin support 124 and an outer bobbin support 122. Inner bobbin support 124 and outer bobbin support 122 may be coupled to base 105 and protrude substantially perpendicular to the plane defined by an upper surface of base 105. Bobbin 120 may be conical, with an outer diameter portion of bobbin 120, proximate to outer diameter 113, being larger than an inner diameter portion of bobbin 120, proximate to inner diameter 112. Bobbin 120 may be configured to store fibrous material 126 rolled about bobbin 120. In operation, bobbin 120 may unroll fibrous material 126 onto bedplate 110. As bedplate 110 rotates, layers of fibrous material 126 may be stacked on top of one another with each revolution of bedplate 110. Fibrous material 126 may be comprised of carbon fiber, OPF, or any other suitable fibrous material.

In various embodiments, loom system 100 may comprise an air entangling module 130. Air entangling module 130 may comprise an air entangling head 135, an inner support 131, and an outer support 132. Air entangling head 135 may span the length of bedplate 110 between inner diameter 112 and outer diameter 113. Air entangling head 135 may be supported by outer support 132 proximate to outer diameter 113 and inner support 131 proximate to inner diameter 112. Inner support 131 and outer support 132 may be coupled to base 105 and protrude substantially perpendicular to the plane defined by the upper surface of base 105. In various embodiments, an outer diameter portion 136 of air entangling head 135 proximate to outer diameter 113 may have a larger width than an inner diameter portion 137 of air entangling head 135 proximate to inner diameter 112. Air entangling head 135 may be suspended above bedplate 110 and/or the layers of fibrous material 126 that have accumulated with rotations of bedplate 110 about axis of rotation 102.

Figure 2:
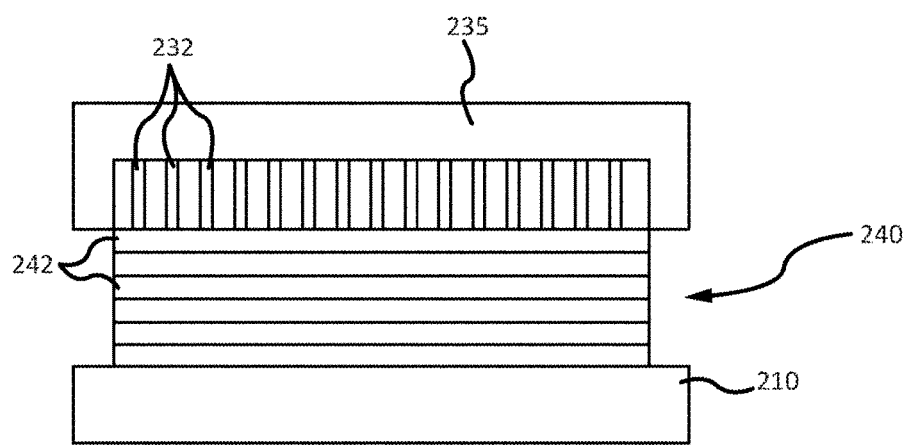
FIG. 2 illustrates an entangling head, fibrous layers, and a bedplate of a system for making a composite structure, in accordance with various embodiments.

With combined reference to FIGS. 1A, 1B, and 2, in various embodiments, air entangling head 135, 235 may float along the heights of inner support 131 and outer support 132, i.e., air entangling head 135 may have freedom of motion along the heights of inner support 131 and outer support 132, such that air entangling head 135, 235 is always resting on top of, or in contact with, the top of stack 240 of fibrous layers 242. Stack 240 of fibrous layers 242 may be disposed on baseplate 210, similar to bedplate 110 in FIGS. 1A and 1B. In various embodiments, air entangling head 135 may be suspended above the top of stack 240 of fibrous layers 242, and may come in contact with fibrous layers 242 when lowered from a suspended position.

In various embodiments, in response to fibrous material 126 reaching an entangling zone 139 located under air entangling head 135 during rotation of bedplate 110, air entangling head 135 may be in contact with, or come into contact with, the top of stack 240 of fibrous layers 242. In response, air entangling head 135 may apply jets of air to fibrous layers 242 to create z-fibers between fibrous layers 242 in a direction perpendicular to fibrous layers 242 depicted in FIG. 2. Jets of air may be applied to stack 240 through air-jet holes 232 in air entangling head 235. Compressed air may be accelerated to high velocity and expelled through air-jet holes 232 to entangle fibrous layers 242 by creating z-fibers. Air entangling head 235 may comprise any number of air-jet holes 232 and may comprise air-jet holes 232 of various sizes and arrangements. Air entanglement of fibrous layers 242 may be controlled by the size of the air-jet holes 232 of air entangling head 235, the air pressure of the jets of air, the orientation of air-jet holes 232 relative to fibrous layers 242, and/or by other mechanisms.

FIGS. 1A and 1B, in accordance with various embodiments, depict air entangling head 135 extending above only a portion of the bedplate 110, and entangling zone 139 being on a portion of bedplate 110 under air entangling head 135. In various embodiments, air entangling head 135 may comprise an annular shape aligned over the entire area, or a substantial portion, of bedplate 110. In various embodiments comprising an annular air entangling head, the entire annulus, or a substantial portion, of the preform is air entangled simultaneously. Thus, fibrous layers (FIG. 2) do not pass through entangling zone 139 as depicted in FIGS. 1A and 1B, but rather, the entire annulus, or a substantial portion of the annulus, is entangled simultaneously, causing the entire area of bedplate 110 to be an entangling zone.

Figure 3:
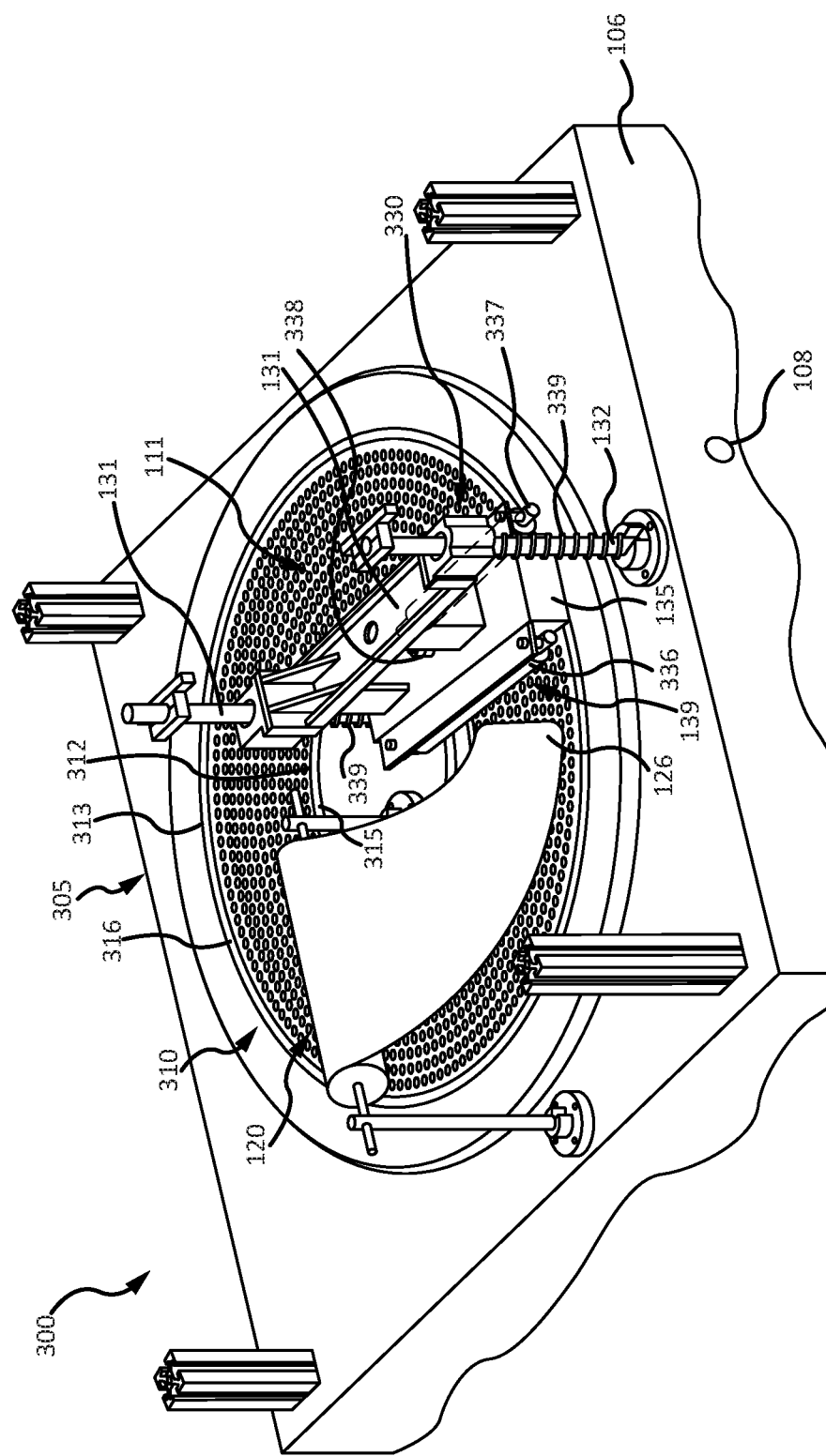
FIG. 3 illustrates a perspective view of a portion of a loom system for making a composite structure, in accordance with various embodiments.

In various embodiments, with additional reference to FIG. 3, an air entangling module, such as air entangling module 330, may comprise one or more rollers, such as first roller 336 and/or second roller 337. Elements with the like element numbering between figures are intended to be the same and will not be repeated for the sake of clarity. One or more rollers in a loom system, such as loom system 300, may be located anywhere along bedplate 310, and may be configured to flatten or hold down fibrous material 126 as it is disposed onto bedplate 310. Additionally, the rollers may be configured to drive fibrous material 126 through entangling zone 139. Rollers may span a length of bedplate 310 between an inner diameter 312 and an outer diameter 313 of bedplate 310.

As depicted in FIG. 3, in various embodiments, first roller 336 and/or second roller 337 may be coupled to air entangling head 135. In various embodiments, a roller, such as first roller 336, may be coupled to a proximal side 138 of air entangling head 135, proximal side 138 being more proximate to where fibrous layers 242 (FIG. 2) of fibrous material 126 are disposed than a distal side of air entangling head 135 opposite proximal side 138. In various embodiments, a roller, such as second roller 337 may be coupled to air entangling head 135 on the distal side. First roller 336 and/or second roller 337 may be conical, such that a portion of first roller 336 and/or second roller 337 proximate to outer diameter 313 may be larger than a portion of first roller 336 and/or second roller 337 proximate to inner diameter 312.

In operation, with combined reference to FIGS. 2 and 3, bedplate 310 may rotate about axis of rotation 102 (depicted in FIGS. 1A and 1B). As fibrous layers 242 of fibrous material 126 are disposed on bedplate 310, which is coupled to base 305, fibrous material 126 of fibrous layers 242 will reach entangling zone 139. Air entangling head 135 may be floating such that air entangling head 135 rests on the top fibrous layer 242 of fibrous material 126. In various embodiments, with first roller 336 coupled to the proximal side of air entangling head 135, fibrous material 126 will be flattened or held down by first roller 336 prior to air entangling head 135 applying jets of air to fibrous material 126 to entangle fibrous layers 242. In various embodiments, with second roller 337 coupled to the distal side of air entangling head 135, fibrous material 126 will be flattened or held down by second roller 337 after air entangling head 135 applies jets of air to fibrous material 126 to entangle fibrous layers 242. Compressed air may be supplied to air entangling head 135 through nozzle 338 or air entangling module 330.

In various embodiments, to apply more or less of a load by air entangling head 135 and rollers 336, 337 onto fibrous layers 242 of fibrous material 126, springs 339 may be coupled to inner support 131 and/or outer support 132, one spring 339 being an inner diameter spring and the other being an outer diameter spring. To apply a reduced load by air entangling head 135 and rollers 336, 337 on fibrous layers 242, springs 339 may be extension springs. To apply an increased load by air entangling head 135 and rollers 336, 337 on fibrous layers 242, springs 339 may be compression springs. The load applied by air entangling head 135 and rollers 336, 337 on fibrous layers 242 may be adjusted in any other suitable way, such as adjusting the weight of rollers 336, 337 and/or air entangling head 135.

In various embodiments, with further reference to FIGS. 2 and 3, a first fibrous layer 242 of stack 240 may be disposed on bedplate 310. The first fibrous layer 242 may be coupled to bedplate 310 in any suitable manner. In various embodiments, bedplate 310 may comprise an inner clamp 315 at inner diameter 312 and an outer clamp 316 at outer diameter 313. Inner clamp 315 may clamp an inner diameter portion of the first fibrous layer 242 to bedplate 310 and outer clamp 316 may clamp an outer diameter portion of the first fibrous layer 242 to bedplate 310. The first fibrous layer 242 may be clamped down so that fibrous layers 242 subsequently disposed on top of the first fibrous layer 242 may be entangled to the first fibrous layer 242 by jets of air from air entangling head 135 at entangling zone 139.

Figure 4:
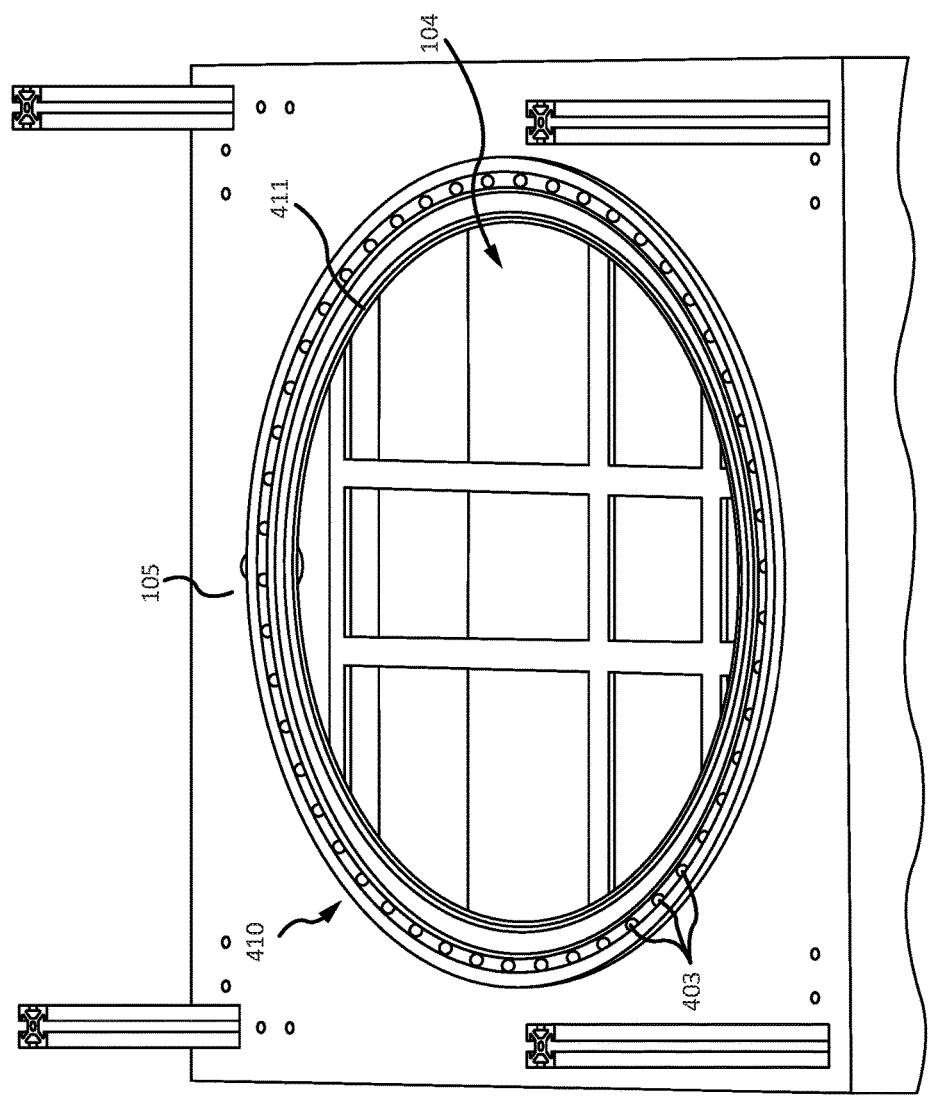
FIG. 4 illustrates a perspective view of the base of a loom system for making a composite structure, in accordance with various embodiments.

With reference again to FIGS. 1A, 1B, and 2, in various embodiments, base 105 may comprise an upper base 106 and a lower base 107. In various embodiments, a vacuum chamber 104 may be enclosed in base 105, between upper base 106 and lower base 107. Lower base 107 may be configured to separate from upper base 106 to expose vacuum chamber 104. In various embodiments, apertures 111 in bedplate 110 may provide fluid communication between fibrous layers 242 and vacuum chamber 104, such that stray fibers breaking from fibrous material 126 caused by jets of air during entangling may be caught in vacuum chamber 104. Stray fibers in vacuum chamber 104 may be vacuumed out through vacuum aperture 108, or otherwise removed from vacuum chamber 104. Vacuum chamber 104 is also depicted in FIG. 4 through a bedplate void defined by base rim 411. Vacuum chamber 104 is visible through the bedplate void in response to bedplate 110 being decoupled from base 105.

In various embodiments, an upper vacuum head 127 may be coupled to an upper surface of base 105 proximate to bedplate 110 and entangling zone 139. Upper vacuum head 127 may be coupled to a vacuum source and configured to collect stray fibers breaking from fibrous material 126 caused by jets of air during entangling. Upper vacuum head 127 may be coupled at any suitable location on base 105. In various embodiments, a housing may be coupled to base 105, enclosing the area comprising bedplate 110, bobbin 120, and air entangling module 130. The enclosed area may also be configured to aid in the vacuum collection of stray fibers through upper vacuum head 127.

In various embodiments, base 105 may comprise an emergency shutoff 109 configured to stop operation of loom system 100 in response to engaging emergency shutoff 109. Emergency shutoff 109 may be disposed anywhere on base 105.

In various embodiments, base 105 may be coupled to a support structure 170 configured to support base 105 and the components coupled to base 105 in a desired spatial location. As depicted in FIGS. 1A and 1B, support structure 170 may comprise legs 172 which couple to base 105. Lower base 107 and/or upper base 106 may be configured to move along legs 172 to expose vacuum chamber 104. In various embodiments, brackets 174 may couple legs 172 to a floor or foundation. Legs 172 may be coupled to a floor or foundation in any suitable manner. Base 105 may be coupled to support structure 170 and/or legs 172 by brackets 173 or in any other suitable manner.

In various embodiments, support structure 170 may comprise a lower support 175 configured to support a motor 160 of loom system 100. Motor 160 may be coupled to support structure 170 at lower support 175, or at any other suitable location on support structure 170. Motor 160 may be configured to drive a drive shaft 134, which may take place by rotating one or more gears 162. Drive shaft 134 may be disposed through vacuum chamber 104 and couple to bedplate 110, to rotate bedplate 110 during operation of motor 160. Motor 160 may be separated by a distance from bedplate 110 and/or base 105 in order to avoid stray fibers resulting from air entangling from contaminating motor 160.

Figure 5:
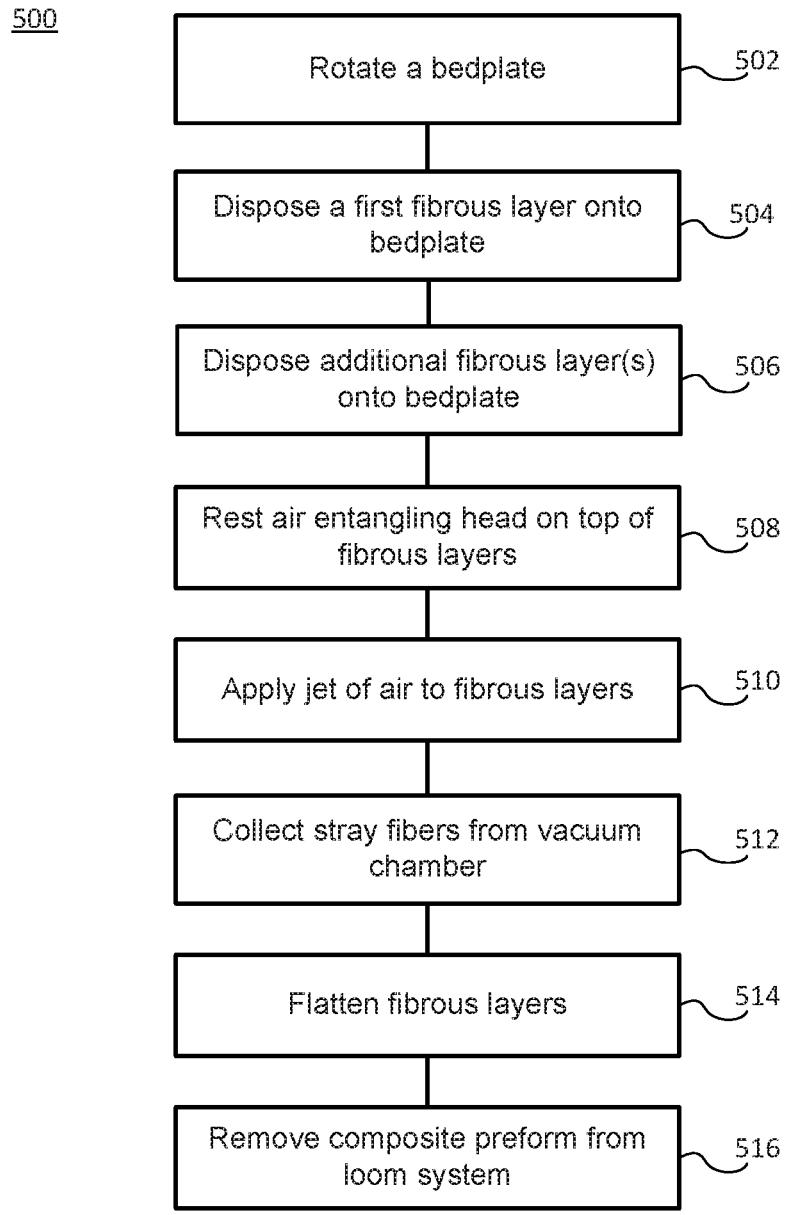
FIG. 5 illustrates a method for making a composite structure, in accordance with various embodiments.

With reference to FIG. 5, a method 500 for making a fibrous preform is depicted, in accordance with various embodiments. With combined reference to FIGS. 1B, 2, and 5, in various embodiments, method 500 may comprise rotating bedplate 110 (step 502) about axis of rotation 102. Bedplate 110 may be rotated by motor 160, which drives drive shaft 134 coupled to bedplate 110. A first fibrous layer 242 may be disposed onto bedplate 110 (step 504) by bobbin 120, or in any other suitable manner. Step 504 may take place before, during, or after step 502. The first fibrous layer 242 may be coupled to bedplate 110 by inner and outer clamps 315, 316 or by any other suitable method. An additional fibrous layer(s) 242 may be disposed onto bedplate 110 (step 506) by bobbin 120 or another suitable manner. Fibrous layers 242 may be disposed on bedplate 110 (step 506) during the bedplate 110 rotation (step 502).

In various embodiments, air entangling head 135 may rest on top of fibrous layers 242 (step 508) as fibrous layers 242 are being disposed onto bedplate 110 into stack 240. Air entangling head 135 may float along the heights of inner support 131 and outer support 132 such that air entangling head 135, 235 tends to rest on top of, or in contact with, the top of stack 240 of fibrous layers 242. Air entangling head 135 may apply a jet of air to fibrous layers 242 (step 510) to entangle fibrous layers 242 together by forming z-fibers, in response to a portion of un-entangled fibrous material 126 reaching entangling zone 139. Air entangling head 135 may apply a jet of air in response to each fibrous layer 242 being added to stack 240, or in response to any suitable number of fibrous layers 242 being added to stack 240. As a result of the air entangling of fibrous layers 242, stray fibers breaking from fibrous material 126 may pass through apertures 111 in bedplate 110, and accumulate in vacuum chamber 104. Therefore, stray fibers may be collected from vacuum chamber 104 (step 512) by vacuum suction through vacuum aperture 108 or by any other suitable method.

In various embodiments, with combined reference to FIGS. 2, 3, and 5, fibrous layers 242 may be flattened (step 514) by a roller, such as first roller 336 and/or second roller 337, before and/or after entangling zone 139. In various embodiments, fibrous layers 242 may be flattened before air entangling head 135 applies a jet of air to fibrous layers 242 by first roller 336 coupled to the proximal side to air entangling head 135. In various embodiments, fibrous layers 242 may be flattened after air entangling head 135 applies a jet of air to fibrous layers 242 by second roller 337 coupled to the distal side to air entangling head 135.

In various embodiments, steps 506 through 514 may occur while bedplate 110 is rotating (i.e., during step 502). In various embodiments, steps 502 and 506 through 514 may repeat until the fibrous preform of fibrous layers 242 reaches a desired number of layers and/or a desired thickness. With reference to FIGS. 1A, 3, and 5, upon making a fibrous preform comprising the desired number of fibrous layers or the desired thickness, the fibrous preform may be removed from loom system 100 (step 516). The fibrous preform may be removed by moving air entangling head 135 such that it does not block movement of the fibrous preform on bedplate 110 from being lifted in a direction parallel to axis of rotation 102. In various embodiments, air entangling head 135 may be configured to decouple from inner support 131 and/or outer support 132. In various embodiments, air entangling head 135 may decouple from inner support 131 and rotate about outer support 132 so that air entangling head 135 is no longer disposed between inner diameter 112 and outer diameter 113 of bedplate 110. Bobbin 120 may be similarly removed from inner bobbin support 124 and/or outer bobbin support 122, and/or rotated about outer bobbin support 122. The fibrous preform may then be removed from bedplate 110 and loom system 100 by being lifted from bedplate 110.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A loom system for making a fibrous preform, comprising:
    a base;
    a bedplate coupled to the base, wherein the bedplate is configured to rotate about an axis of rotation; and
    an air entangling module coupled to the base, the air entangling module comprising an air entangling head coupled to an outer support and an inner support, wherein the air entangling head is configured to apply a jet of air toward the bedplate at an entangling zone, wherein the air entangling head has freedom of motion along the outer support and the inner support, the air entangling head being configured to rest on top of a fibrous layer.

2. The loom system of claim 1, wherein the bedplate comprises an aperture configured to allow circulation of the jet of air from the air entangling head through the bedplate.

3. The loom system of claim 2, further comprising a vacuum chamber comprised within the base and disposed below the bedplate.

4. The loom system of claim 1, further comprising a bobbin coupled to the base configured to dispose the fibrous layer onto the bedplate.

5. The loom system of claim 1, further comprising a first roller coupled to a proximal side of the air entangling head configured to flatten the fibrous layer at the proximal side of the air entangling head.

6. The loom system of claim 1, further comprising a second roller coupled to a distal side of the air entangling head configured to flatten the fibrous layer at the distal side of the air entangling head.

7. The loom system of claim 6, further comprising a first roller coupled to a proximal side of the air entangling head configured to flatten the fibrous layer at the proximal side of the air entangling head.

8. The loom system of claim 1, further comprising an upper vacuum head disposed proximate to the entangling zone, wherein the upper vacuum head is configured to collect stray fibers above the bedplate.

9. The loom system of claim 1, wherein the air entangling module further comprises an inner diameter spring coupled to the inner support and an outer diameter spring coupled to the outer support, wherein the inner diameter spring and the outer diameter spring are configured to at least one of increase or decrease a load applied to the fibrous layer by the air entangling head.

10. The loom system of claim 1, wherein the base is coupled to a support structure configured to support the base and a motor, and separate the base from the motor.

11. The loom system of claim 10, wherein the motor is configured to rotate a driveshaft coupled to the motor, wherein the driveshaft is coupled to the bedplate and is configured to rotate the bedplate.

12. A loom system for making a fibrous preform, comprising:
   a base;
   a bedplate coupled to the base, wherein the bedplate is configured to rotate about an axis of rotation;
   an air entangling module coupled to the base, the air entangling module comprising an air entangling head configured to apply a jet of air toward the bedplate at an entangling zone; and
   a vacuum chamber within the base and disposed below the bedplate.

13. The loom system of claim 12, further comprising a bobbin configured to dispose a fibrous layer onto the bedplate.

14. The loom system of claim 12, further comprising a roller coupled to at least one of a proximal side or a distal side of the air entangling head configured to flatten a fibrous layer proximate to the entangling zone.

15. The loom system of claim 14, wherein the air entangling head is coupled to an inner support and an outer support, wherein the air entangling head has freedom of motion along the inner support and the outer support.

16. The loom system of claim 12, further comprising an upper vacuum head disposed proximate to the entangling zone, wherein the upper vacuum head is configured to collect stray fibers from an upper surface of the base.

17. A method for making a fibrous preform, comprising:
   rotating a bedplate of a loom system for making the fibrous preform about an axis of rotation;
   disposing a plurality of fibrous layers onto a first fibrous layer during the rotating the bedplate;
   resting an air entangling head of an air entangling module on top of the plurality of fibrous layers; and
   applying a jet of air to the plurality of fibrous layers from the air entangling head at an entangling zone of the loom system.

18. The method of claim 17, further comprising disposing the first fibrous layer onto the bedplate by clamping an inner diameter portion and an outer diameter portion of the first fibrous layer to the bedplate.

19. The method of claim 17, further comprising collecting stray fibers from a vacuum chamber disposed below the bedplate.

20. The method of claim 17, further comprising flattening by a roller coupled to the air entangling head the plurality of fibrous layers at least one of before or after the applying the jet of air to the plurality fibrous layers.

* * * * *